United States Patent
Park

(10) Patent No.: US 8,493,439 B2
(45) Date of Patent: *Jul. 23, 2013

(54) APPARATUS FOR DISPLAYING 3D IMAGE

(75) Inventor: Tae Soo Park, Seoul (KR)

(73) Assignee: LG Electronics Inc. (KR)

( * ) Notice: Subject to any disclaimer, the term of this patent is extended or adjusted under 35 U.S.C. 154(b) by 1288 days.

This patent is subject to a terminal disclaimer.

(21) Appl. No.: 12/094,910

(22) PCT Filed: Sep. 27, 2007

(86) PCT No.: PCT/KR2007/004719
§ 371 (c)(1),
(2), (4) Date: Oct. 23, 2008

(87) PCT Pub. No.: WO2008/039004
PCT Pub. Date: Apr. 3, 2008

(65) Prior Publication Data
US 2009/0128547 A1    May 21, 2009

(30) Foreign Application Priority Data

Sep. 29, 2006 (KR) .................. 10-2006-0095483

(51) Int. Cl.
*H04N 13/04* (2006.01)
*G06T 15/00* (2006.01)
*G03B 21/00* (2006.01)

(52) U.S. Cl.
USPC ................. 348/59; 348/42; 345/419

(58) Field of Classification Search
USPC .............. 348/42, 59; 345/419; 353/7
See application file for complete search history.

(56) References Cited

U.S. PATENT DOCUMENTS

| | | | | |
|---|---|---|---|---|
| 5,546,120 A | * | 8/1996 | Miller et al. | 348/59 |
| 6,064,424 A | * | 5/2000 | van Berkel et al. | 348/51 |
| 6,293,898 B1 | * | 9/2001 | Yang | 359/22 |
| 6,603,504 B1 | * | 8/2003 | Son et al. | 348/54 |
| 6,801,243 B1 | * | 10/2004 | Van Berkel | 348/59 |
| 6,825,985 B2 | * | 11/2004 | Brown et al. | 359/619 |
| 6,975,439 B2 | * | 12/2005 | Thomason et al. | 359/15 |

(Continued)

FOREIGN PATENT DOCUMENTS

| | | |
|---|---|---|
| CN | 1530691 A | 9/2004 |
| CN | 1538378 A | 10/2004 |

(Continued)

OTHER PUBLICATIONS van Berkel, et al. "Characterisation and Optimisation of 3D-LCD Module Design"; Philips Research Laboratories, United Kingdom; Published Proc SPIE; vol. 3012, pp. 179-187, 1997.

(Continued)

*Primary Examiner* — Ranodhi Serrao
(74) *Attorney, Agent, or Firm* — KED & Associates, LLP

(57) ABSTRACT

A three-dimensional image display apparatus having improved resolution and an expanded elementary three-dimensional space is disclosed. The three-dimensional image display apparatus includes a display device (22) sampling, multiplexing and displaying a plurality of parallax images so as to implement a three-dimensional image and a lenticular lens plate (24) provided on the front surface of the display device (22) and having a vertical axis (25) tilted from a vertical axis of the display device by a predetermined angle α, wherein the number of parallax images included in an elementary three-dimensional image of the three-dimensional image is a multiple of 7.

10 Claims, 13 Drawing Sheets

U.S. PATENT DOCUMENTS

| | | | |
|---|---|---|---|
| 7,425,074 B2 * | 9/2008 | Kang et al. | 353/46 |
| 7,443,392 B2 * | 10/2008 | Tsubaki | 345/419 |
| 7,443,609 B2 * | 10/2008 | Yoon et al. | 359/708 |
| 7,520,638 B2 * | 4/2009 | Chang et al. | 362/294 |
| 2005/0057567 A1 | 3/2005 | Son et al. | 345/441 |
| 2005/0152033 A1 * | 7/2005 | Kang et al. | 359/459 |
| 2005/0213052 A1 * | 9/2005 | Keith et al. | 353/94 |
| 2009/0128547 A1 * | 5/2009 | Park | 345/419 |

FOREIGN PATENT DOCUMENTS

| | | |
|---|---|---|
| CN | 1784022 A | 6/2006 |
| CN | 1837920 A | 9/2006 |
| EP | 0 791 847 B1 | 8/1997 |
| EP | 1 455 540 A2 | 9/2004 |
| EP | 1 566 683 A1 | 8/2005 |
| EP | 1 853 072 A2 | 11/2007 |
| JP | 09-236777 A | 9/1997 |
| JP | 2001-501073 | 1/2001 |
| JP | 2003-185968 A | 7/2003 |
| JP | 2005-234198 A | 9/2005 |
| JP | 2005-258421 A | 9/2005 |
| JP | 2005-309374 A | 11/2005 |
| JP | 2006-018282 A | 1/2006 |
| JP | 2006-174258 A | 6/2006 |
| JP | 2007-298995 A | 11/2007 |
| JP | 2008-083600 A | 4/2008 |
| KR | 10-2005-0060733 A | 6/2005 |
| WO | WO 99/05559 | 2/1999 |
| WO | WO 2005/093494 A1 | 10/2005 |
| WO | WO 2006/077506 A1 | 7/2006 |

OTHER PUBLICATIONS

Japanese Office Action dated May 27, 2010 issued in Application No. 2008-547120.

European Search Report dated May 23, 2011 issued in Application No. 07 80 8461.

* cited by examiner

POSITION OF GREEN
PIXEL OF SECOND
PARALLAX IMAGE

IF m=4

ELEMENTARY THREE-DEMENSIONAL SPACE

IF m=6

(a)

(b)

$C_n$ : $n^{TH}$ CAMERA
$PV_n$ : $n^{TH}$ PARALLAX IMAGE

ELEMENTARY THREE-DIMENSION IMAGE 24

(b)

(a)

$$\frac{\text{AREA A}}{\text{AREA B}} = 0.83$$

APPARATUS FOR DISPLAYING 3D IMAGE

CROSS-REFERENCE TO RELATED APPLICATIONS

This application claims the benefit of PCT application PCT/KR2007/004719 filed on Sep. 27, 2007, which is hereby incorporated by reference, which claims priority under 35 U.S.C. §119 to Korean Application No. 10-2006-0095483 filed on Sep. 29, 2006, whose entire disclosure is hereby incorporated by reference.

TECHNICAL FIELD

The present invention relates to a three-dimensional image display apparatus, and more particularly to, a three-dimensional image display apparatus of which resolution does not deteriorate although the number of parallax images used for implementing a three-dimensional image increases.

BACKGROUND ART

In general, different images are input to the left and right eyes of a viewer and are then combined in the brain of the viewer such that a three-dimensional image is perceived. In order to form such a three-dimensional image, a device for providing different images to the left and right eyes of the viewer is required. Conventionally, a linear polarization display apparatus which uses a pair of three-dimensional glasses for dividing an image into a left-eye image and a right-eye image was used. However, such a linear polarization display apparatus is inconvenient in that the viewer must wear the three-dimensional glasses.

Accordingly, in order to solve such a problem, methods which form a three-dimensional image without using glasses were suggested. In these methods, a three-dimensional image display apparatus is configured by combining a flat display device, such as a liquid crystal display panel (LCD) and a plasma display panel (PDP), and a device for dividing an image by different angles viewed by the viewer. Depending upon the device for dividing the image by the different angles viewed by the viewer, a wide range of methods, such as a lenticular method using a lenticular lens sheet, a parallax barrier method using a slit array sheet, an integral photography method using a micro-lens array sheet, and a holography method using a disturbance effect, can be proposed.

Among them, the parallax barrier method is disadvantageous in that most of light is blocked by slits and thus the brightness of the screen decreases. The integral photography method and the holography method are unlikely to be implemented because a massive amount of data must be processed. Accordingly, recently, the lenticular method is attracting attention.

FIG. 1 is a view showing a conventional three-dimensional image display apparatus using the lenticular method. As shown in FIG. 1, the three-dimensional image display apparatus using the lenticular method includes a flat display device 10 for displaying a plurality of parallax images and a lenticular lens plate 12 provided on the front surface of the flat display device 10. The lenticular lens plate 12 is provided such that the vertical axis thereof is parallel to the vertical axis of the flat display device 10, and is spaced apart from the flat display device 10 by a predetermined distance such that an image is mainly laid on a focus surface of a lenticular lens.

However, the conventional three-dimensional image display apparatus has the following problems.

As shown in FIG. 1, in the conventional three-dimensional image display apparatus using the lenticular method using four images, vertical resolution is equal to that of the parallax images before sampling, but horizontal resolution is reduced to ¼ of the resolution of the parallax images before sampling. That is, as shown in FIG. 2, in the conventional lenticular method, the horizontal resolution is reduced to 1/n (n: number of parallax images).

To obviate the above problems, FIG. 3 is a view showing the resolution of the embodiment of the three-dimensional image display apparatus according to the present invention. In FIG. 6, the lenticular lens 12 is provided such that the vertical axis 16 of the lenticular lens 12 is tilted by the predetermined angle α. A method of improving the horizontal resolution at the sacrifice of the vertical resolution is suggested. In FIG. 7, nine parallax images are used for implementing a three-dimensional image. As shown, the horizontal resolution is reduced to about ⅓ of the resolution of a conventional two-dimensional image, instead of ⅑ of the resolution of the conventional two-dimensional image. However, the vertical resolution is reduced to about ⅓ of the resolution of the conventional method which did not deteriorate. That is, the deterioration of the horizontal/vertical resolution is in balance and thus a viewer feels that image quality is improved compared with the conventional method. At this time, the tilt angle α of the lenticular lens is defined by Equation 1.

$$\alpha = \arctan(Hp/VpR) \quad \text{Equation 1}$$

where, Hp denotes a subpixel period in a horizontal direction, Vp denotes a subpixel period in a vertical direction, and R denotes the number of rows used in an array of plural images, which is an integer of 2 or more.

For example, the lenticular lens plate 12 is tilted such that α becomes 9.4° or 6.3°. A parallelogram 18 shown in FIG. 7 represents unit resolution in the method of tilting the lenticular lens and a rectangle 20 represents unit resolution in a two-dimensional image.

When the three-dimensional image is viewed using the three-dimensional image display apparatus using the lenticular lens method, there is a region for allowing a viewer to optimally view the image, which is called an elementary three-dimensional space. Accordingly, as the size of the elementary three-dimensional space increases, a space for allowing the viewer to normally view the three-dimensional image without pseudoscopic vision expands. The size of the elementary three-dimensional space is represented by the horizontal length L of the elementary three-dimensional space and the horizontal length L is calculated by Equation 2.

$$L = m \times d \quad \text{Equation 2}$$

where, m denotes the number of parallax images included in the elementary three-dimensional image and d denotes the length of the elementary three-dimensional space corresponding to one parallax image.

Accordingly, it can be seen that L must increase in order to increase the size of the elementary three-dimensional space and the number m of parallax images or the length D of the elementary three-dimensional space corresponding to one parallax image must increase in order to increase L. This will be described in detail with reference to FIG. 8. FIG. 8A shows a case where four parallax images are used (m=4) and FIG. 8B shows a case where six parallax images are used (m=6). As can be seen from FIGS. 8A and 8B, L increases if d or m increases and the elementary three-dimensional space expands if L increases.

However, since d must be smaller than a distance between the both eyes of the viewer, there is a limitation in increasing d. Thus, m must increase. However, when m increases, the resolution deteriorates. Accordingly, in the three-dimensional image display apparatus using the lenticular method, the elementary three-dimensional space must expand without deteriorating the resolution.

When the flat display device 10 for displaying the plurality of parallax images is implemented by an LCD in the three-dimensional image display apparatus, the following problems occur. As shown in FIGS. 3A and 3B, as the size of the LCD increases and the LCD and polarization plates (not shown) provided on the front and rear surfaces of the LCD are different from each other in thermal expansion or contraction characteristics, the LCD may be curved forward or backward. In addition, a distance 1 between a three-dimensional filter such as the lenticular lens plate 12 and the flat display device 10 such as the LCD is not uniform over the whole screen and the three-dimensional effect significantly deteriorates.

DISCLOSURE OF THE INVENTION

Accordingly, the present invention is directed to a three-dimensional image display apparatus that substantially obviates one or more problems due to limitations and disadvantages of the related art.

An object of the present invention is to provide a three-dimensional image display apparatus which is capable of expanding an elementary three-dimensional space while minimizing the deterioration of resolution by adjusting a pattern for multiplexing a plurality of parallax images and the tilt angle of the lenticular lens plate.

Another object of the present invention is to provide a three-dimensional image display apparatus which is capable of preventing a liquid crystal display panel used in the three-dimensional image display apparatus from being curved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a three-dimensional image display apparatus, comprising: a display device sampling, multiplexing, and displaying a plurality of parallax images so as to implement a three-dimensional image; and a lenticular lens plate provided on the front surface of the display device and having a vertical axis tilted from a vertical axis of the display device by a predetermined angle $\alpha$, wherein the number of parallax images included in an elementary three-dimensional image of the three-dimensional image is a multiple of 7.

In another aspect of the present invention, a three-dimensional image display apparatus, comprising: a display device sampling, multiplexing, and displaying a plurality of parallax images so as to implement a three-dimensional image; and a lenticular lens plate provided on the front surface of the display device and having a vertical axis tilted from a vertical axis of the display device by a predetermined angle $\alpha$, wherein the predetermined angle $\alpha$ is obtained by $\alpha=\arctan(5Hp/7Vp)$ (where, Hp denotes a subpixel period in a horizontal direction and Vp denotes a subpixel period in a vertical direction).

In another aspect of the present invention, a three-dimensional image display apparatus, comprising: a liquid crystal display panel (LCD) sampling, multiplexing, and displaying a plurality of parallax images so as to implement a three-dimensional image; a three-dimensional image filer provided on the front surface of the LCD, for dividing the plurality of parallax images, and a flat support plate provided on at least one of the front and rear surfaces of the LCD, for supporting the LCD in a plane.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
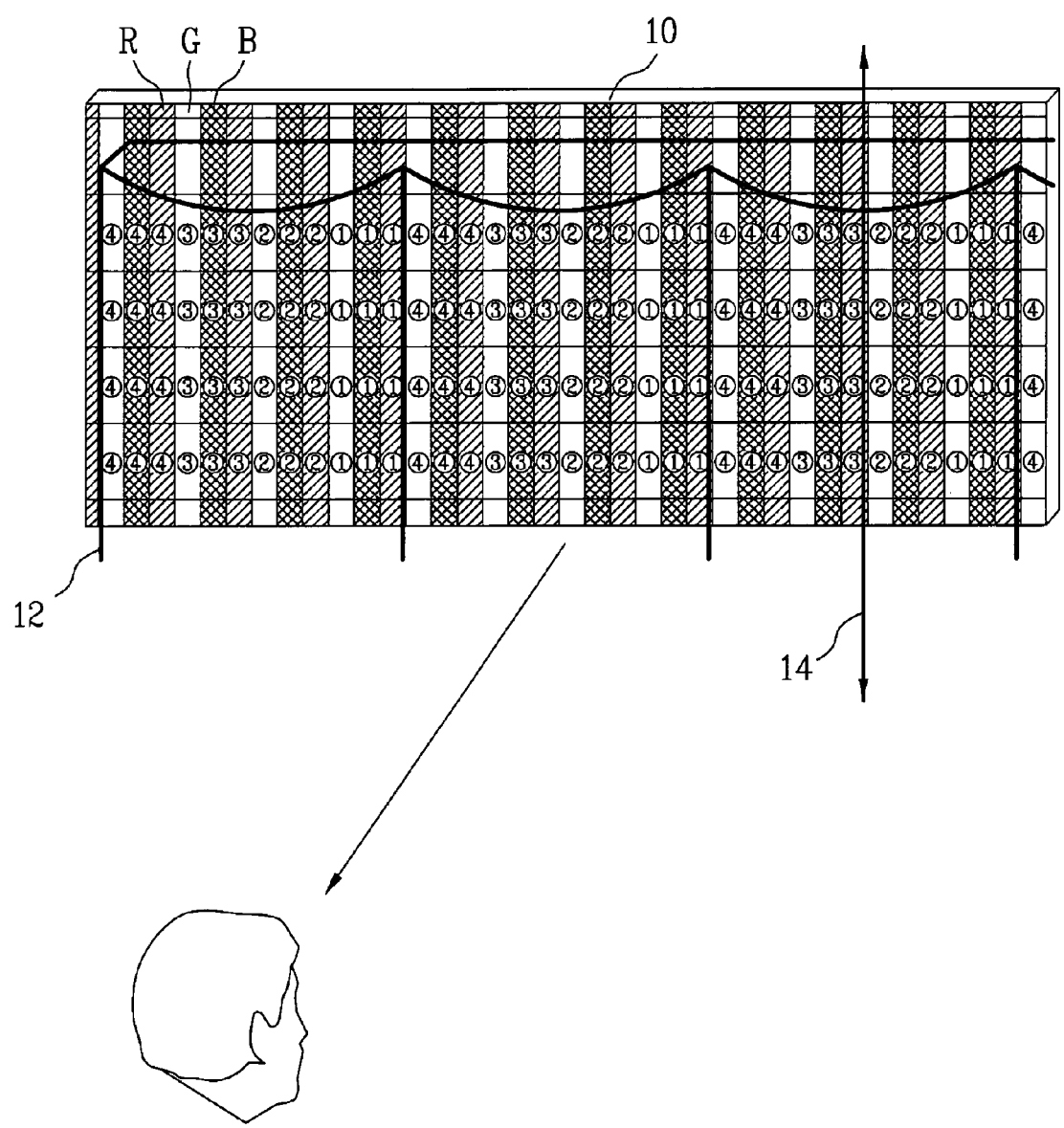
FIG. 1 is a view showing a conventional three-dimensional image display apparatus using a lenticular method.
Figure 2:
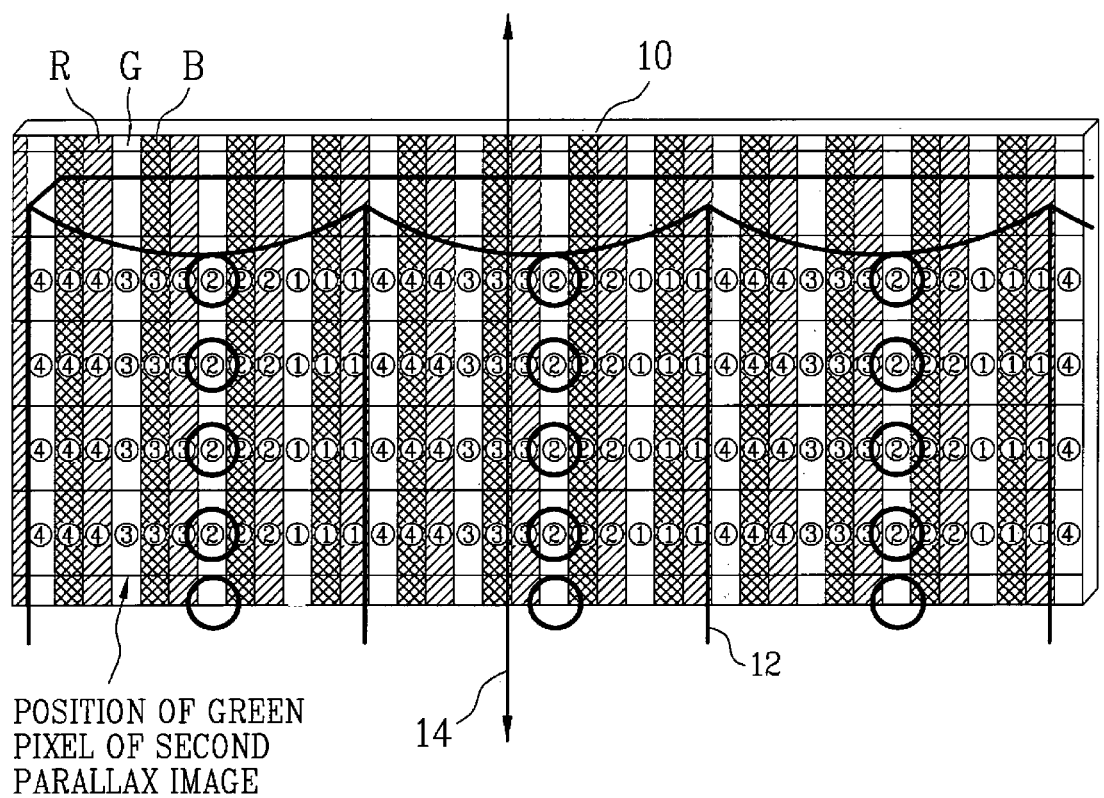
FIG. 2 is a view showing the deterioration of the resolution of the three-dimensional image display apparatus shown in FIG. 1.
Figure 3:
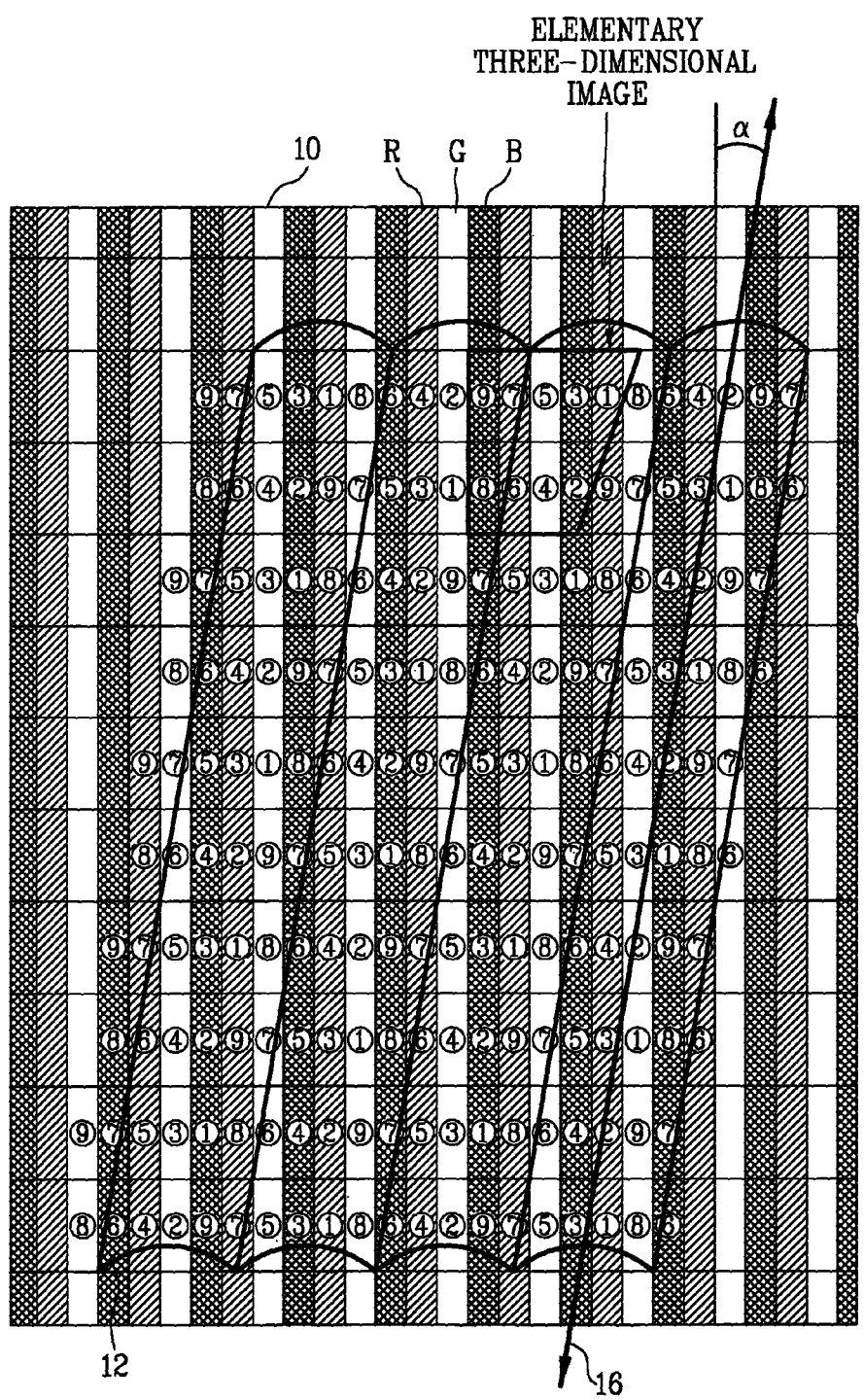
FIG. 3 is a view showing another conventional three-dimensional image display apparatus using a lenticular method.
Figure 4:
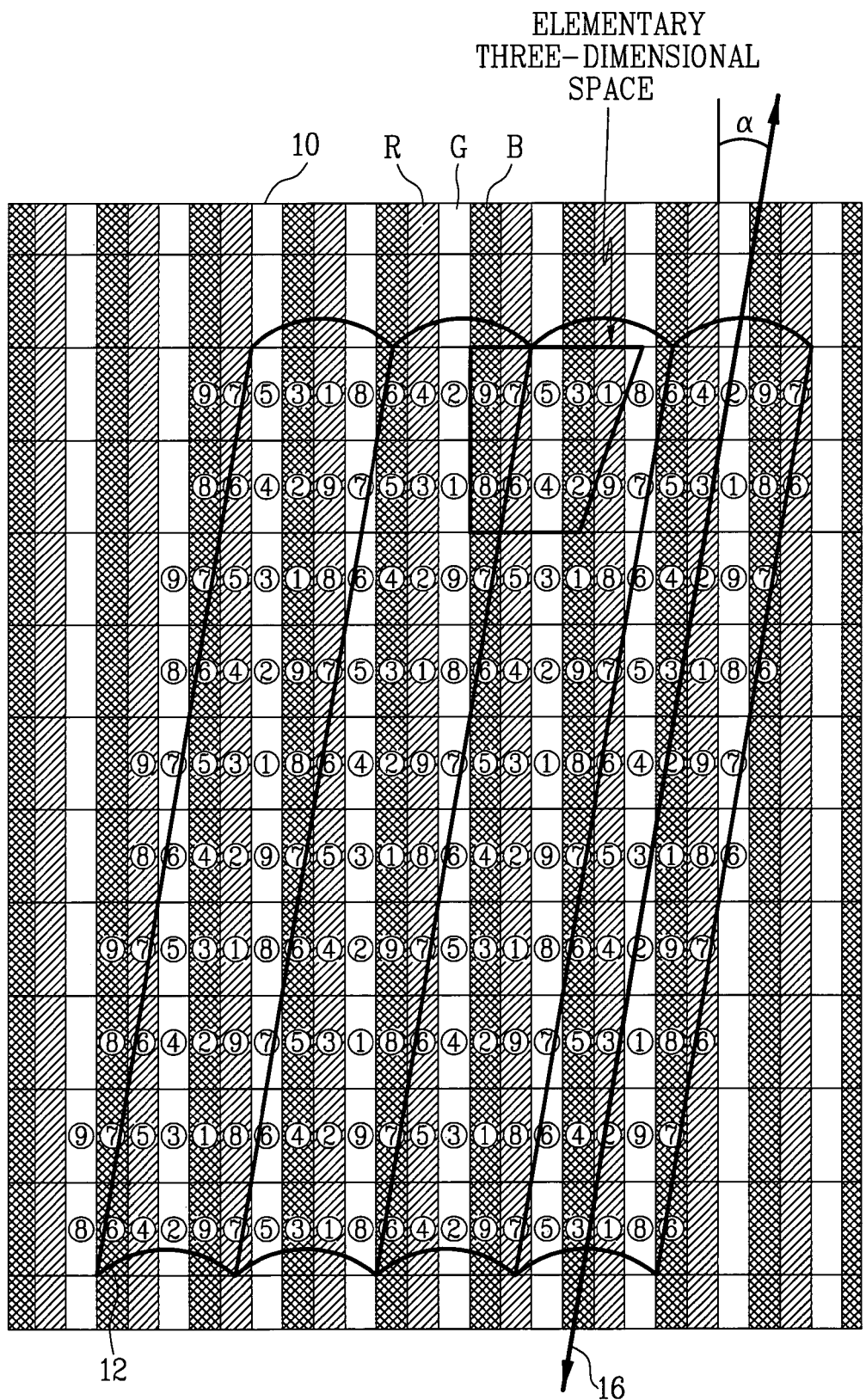
FIG. 4 is a view showing the deterioration of the resolution of the three-dimensional image display apparatus shown in FIG. 3.
Figure 5:
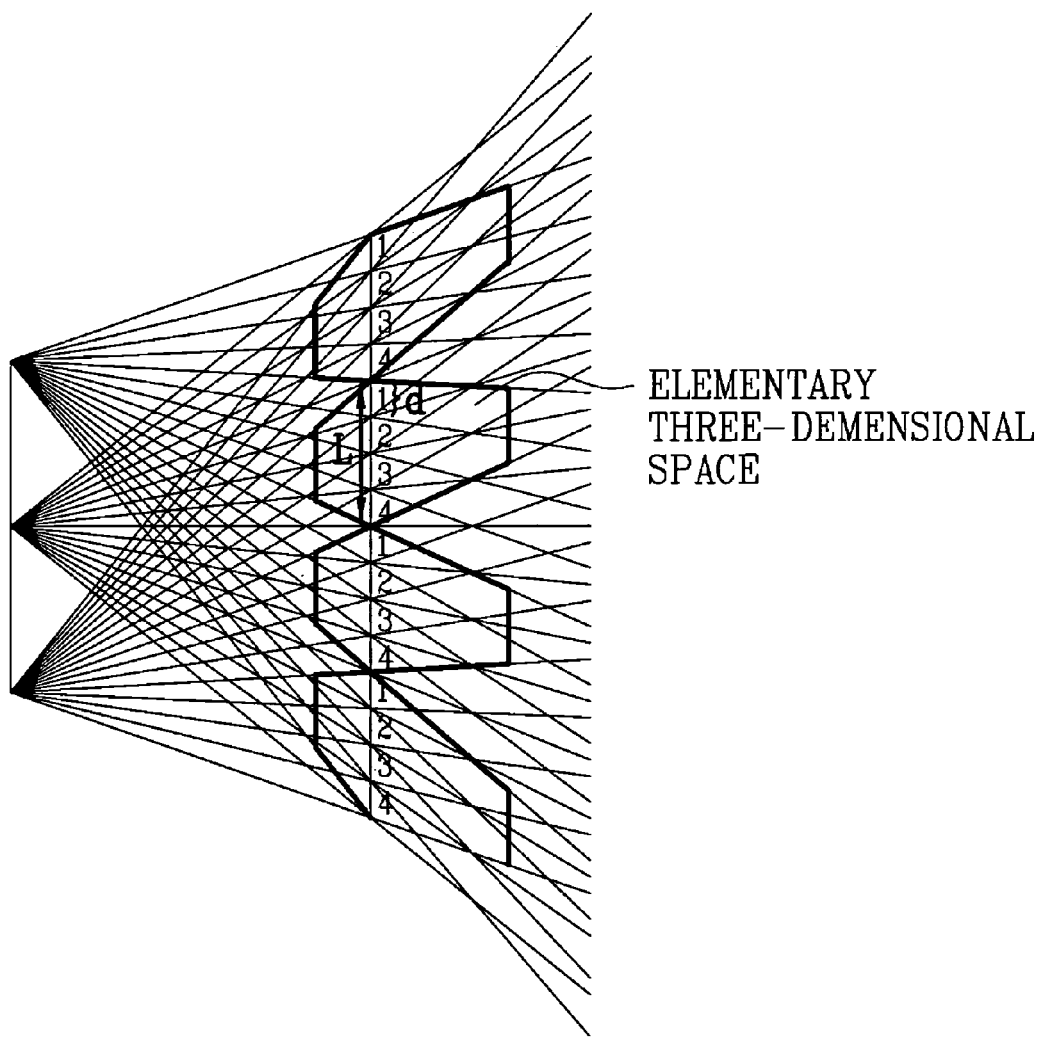
FIG. 5 and FIG. 6 are a view showing an elementary three-dimensional space in a conventional three-dimensional image display apparatus using a lenticular method.
Figure 6:
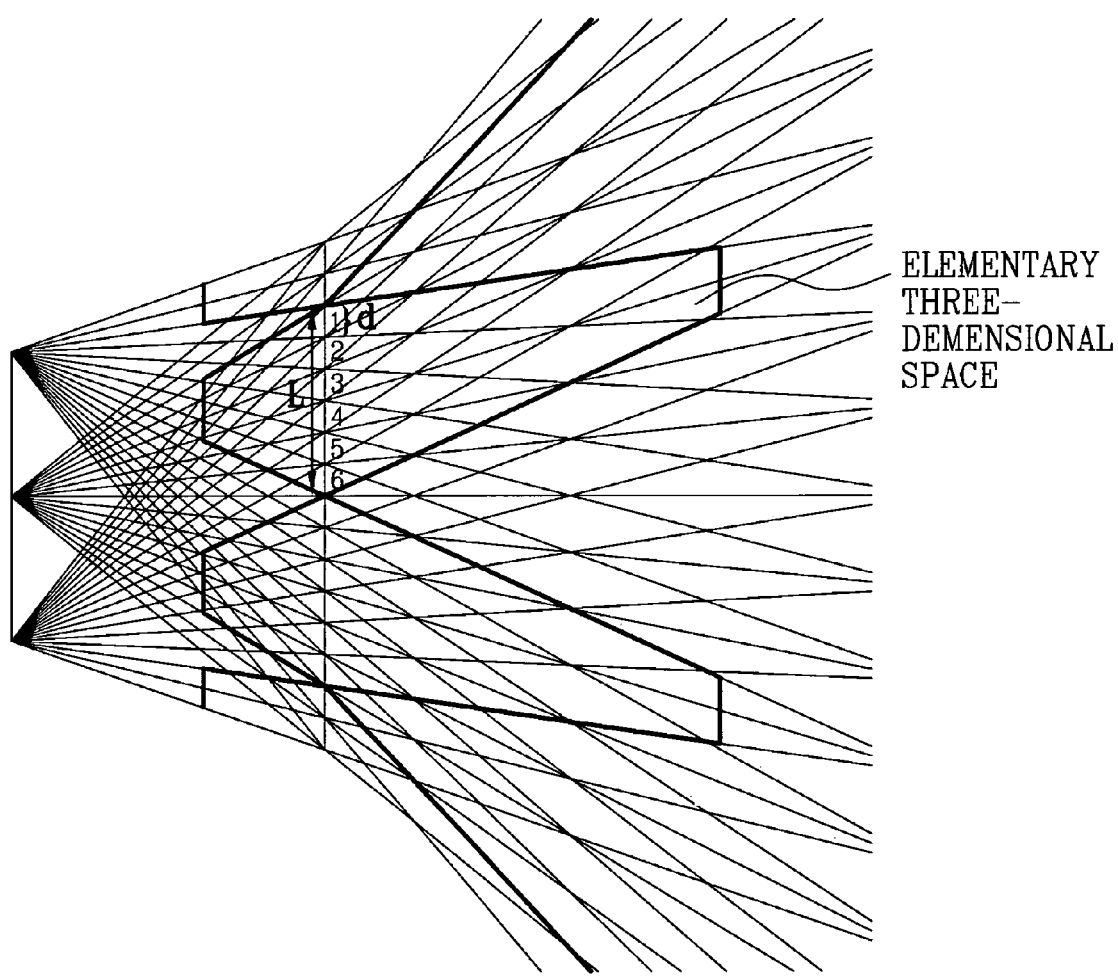
Figure 7:
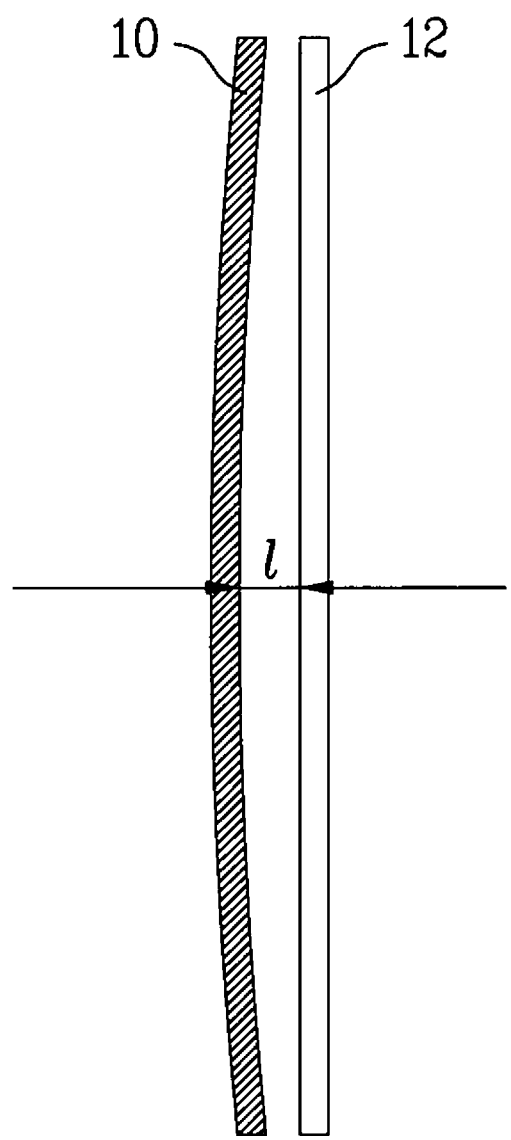
FIG. 7 and FIG. 8 are a view showing a state that an LCD is curved in a case where a flat display device is implemented by the LCD.
Figure 8:
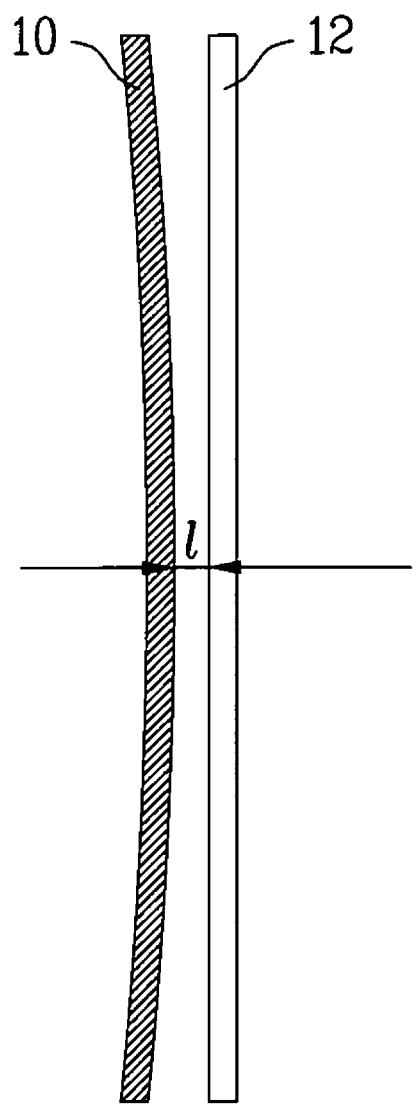
Figure 9:
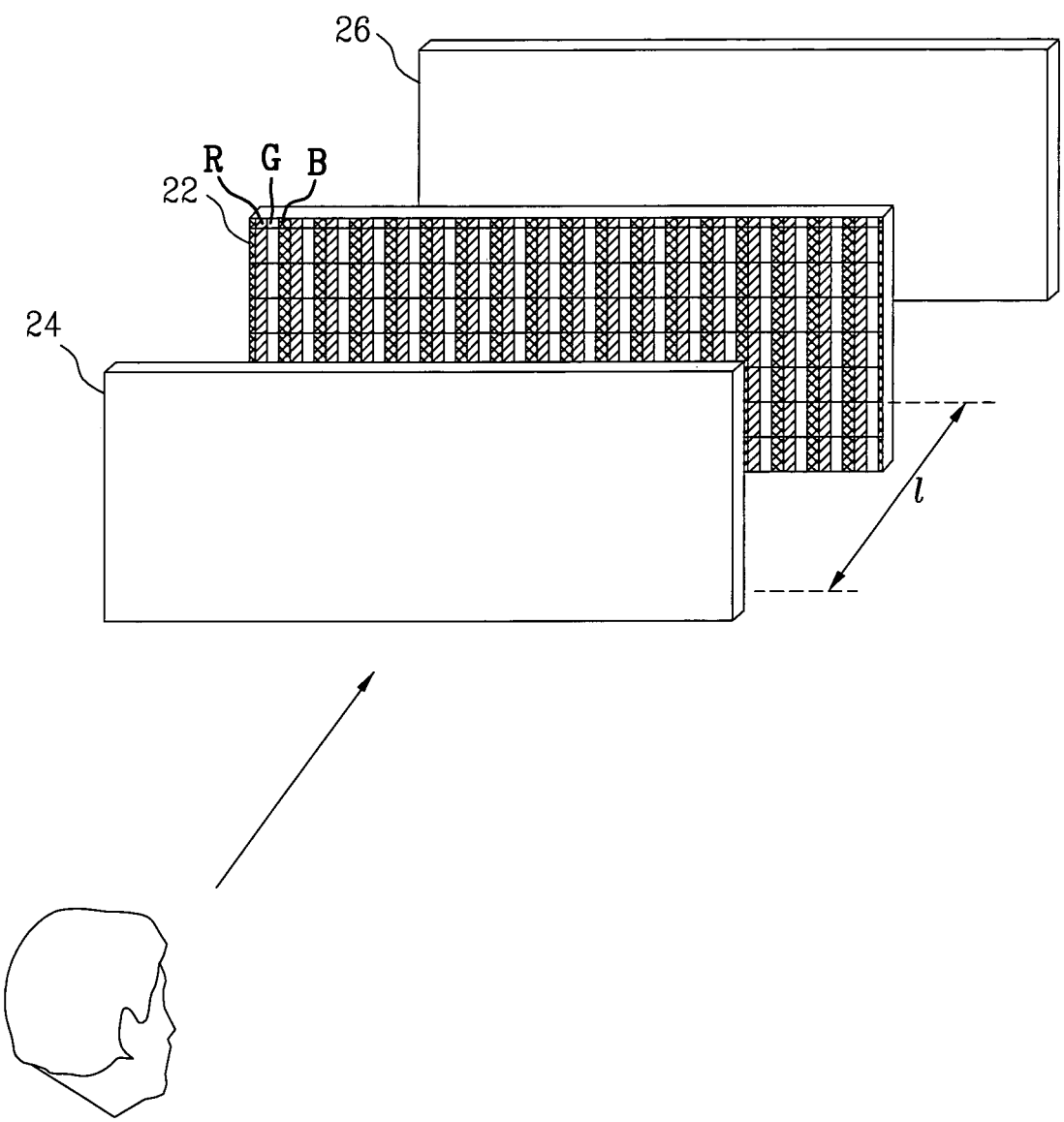
FIG. 9 is a view showing a first embodiment of the three-dimensional image display apparatus according to the present invention using a lenticular method.

FIG. 9 is a view showing a first embodiment of the three-dimensional image display apparatus according to the present invention using a lenticular method.

As shown in FIG. 9, the three-dimensional image display apparatus according to the present invention includes a flat display device 22 for sampling, multiplexing, and displaying a plurality of parallax images and a lenticular lens plate 24 provided on the front surface of the flat display device 22, for dividing the plurality of parallax images. The lenticular lens plate 24 is spaced apart from the flat display device 22 by a predetermined distance 1 such that an image is laid on a focus surface of the lenticular lens. The flat display device 22 may be implemented by an LCD or a PDP. When the flat display device 22 is implemented by the LCD as shown in FIG. 9, the three-dimensional image display apparatus further includes a backlight 26 as a light source. This is because the LCD cannot self-emit light.

In the present invention, in order to solve the deterioration of horizontal resolution, a method of arranging a lenticular lens such that the vertical axis of the lenticular lens is tilted from the vertical axis of the display device by a predetermined angle α is suggested.

Figure 10:
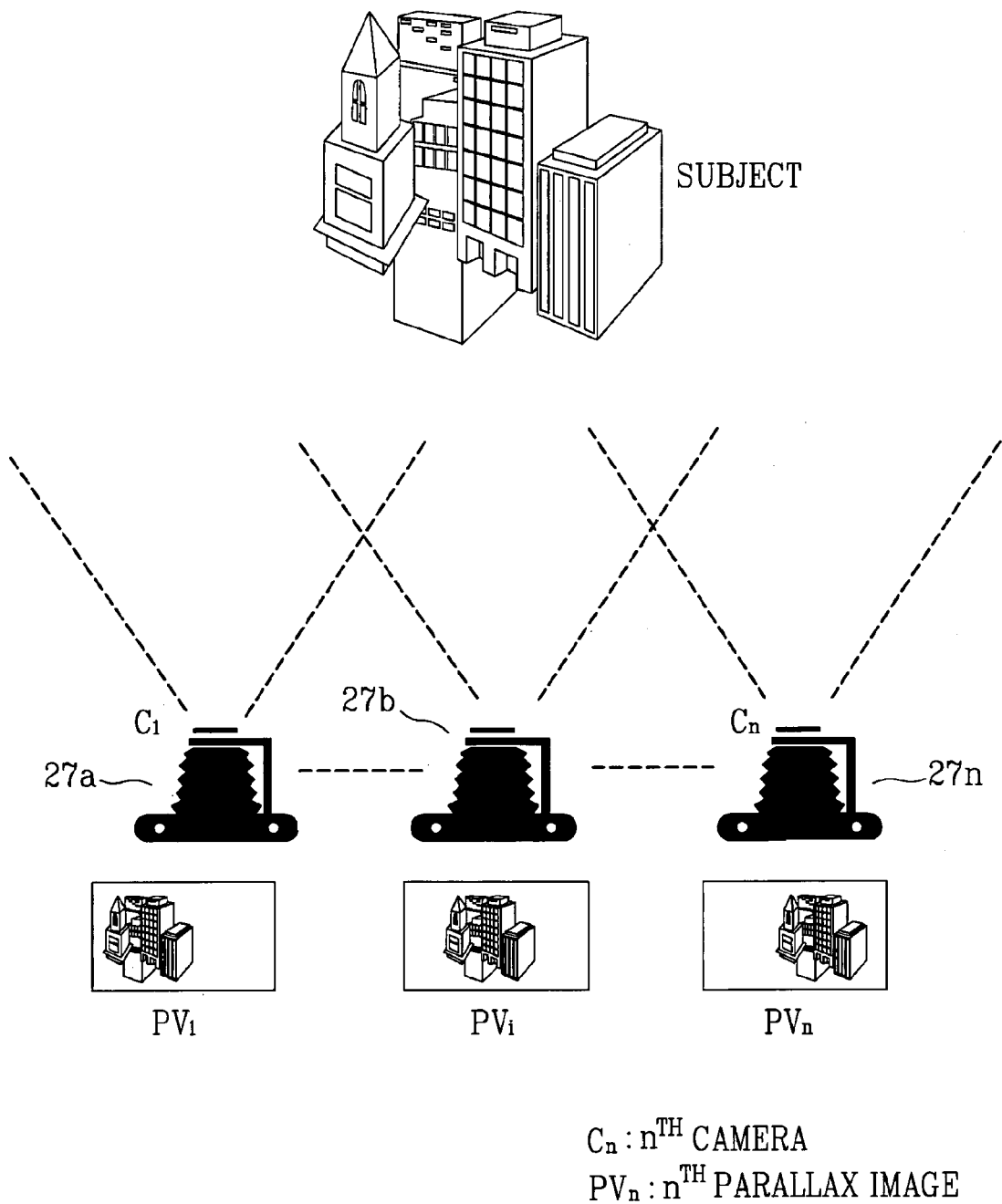
FIG. 10 is a view showing a process of generating a plurality of parallax images.

The plurality of parallax images are generated by acquiring n parallax images PV1, PV2, ..., PVn using n cameras $C_1$, $C_2$, ..., $C_n$ (27a, 27b, ..., 27n), as shown in FIG. 10. The n parallax images are sampled and multiplexed by a predetermined pattern to configure an elementary three-dimensional image.

An elementary three-dimensional image 28 is generated using 7m (m is a natural number) parallax images. In the present embodiment, the number of parallax images used for generating the elementary three-dimensional image is 35, 42, 49 or 56. Among them, the number of parallax images is most preferably 35 in consideration of optimal resolution. Hereinafter, for convenience of description, the elementary three-dimensional image configured using 35 parallax images will be described.

Figure 11:
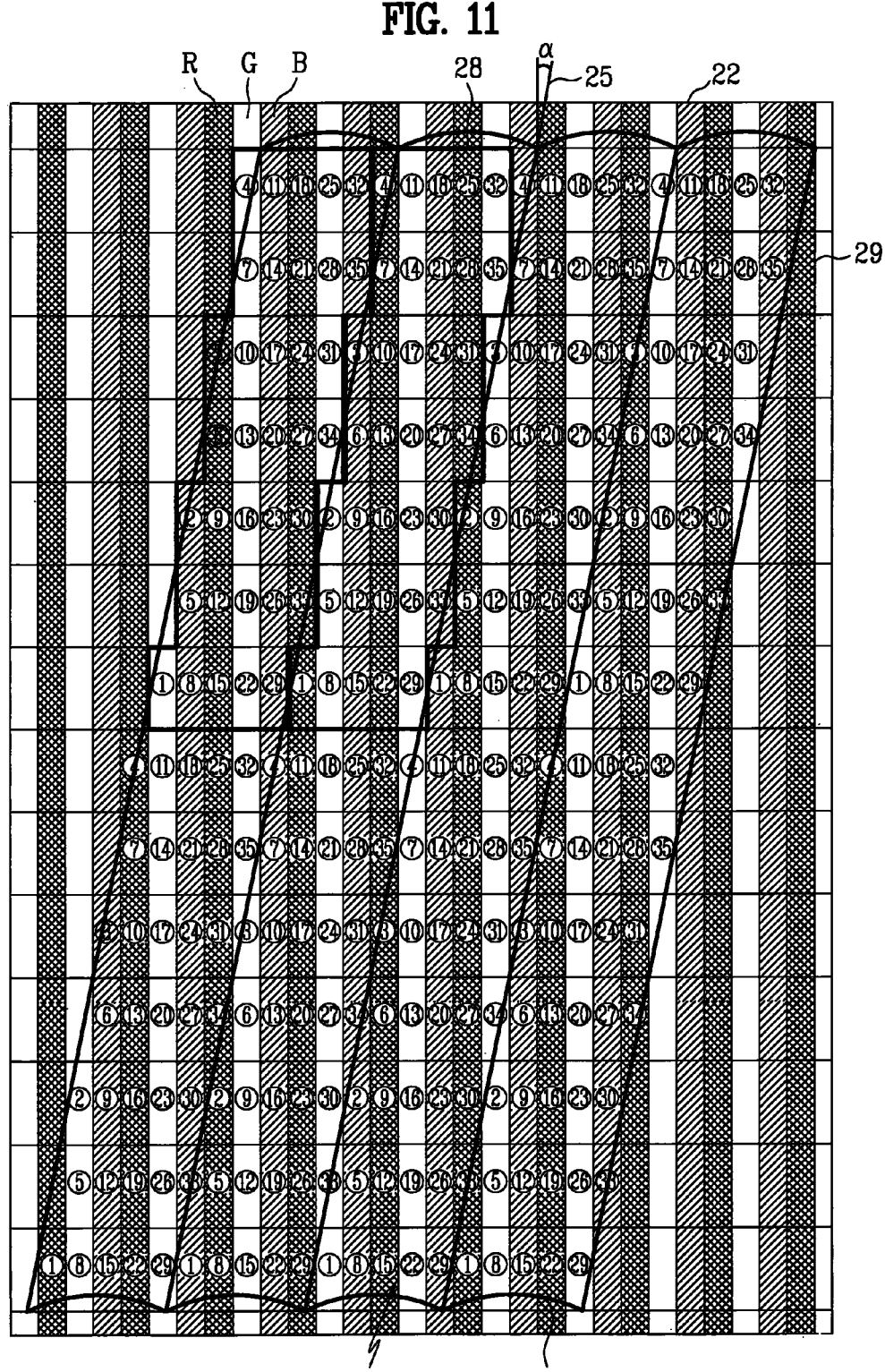
FIG. 11 is a view illustrating a multiplexing pattern of a plurality of parallax images and a tilt angle of a lenticular lens plate in first embodiment of the three-dimensional image display apparatus according to the present invention using a lenticular method.

FIG. 11 is a view illustrating a multiplexing pattern of a plurality of parallax images and a tilt angle of a lenticular lens plate in first embodiment of the three-dimensional image display apparatus according to the present invention using a lenticular method.

As shown in FIG. 11, the elementary three-dimensional image 28 composed of 35 parallax images is repeatedly arranged on the flat display device 22 in the horizontal direction. In the vertical direction, the elementary three-dimensional image 28 is repeatedly arranged while being shifted in the left direction by 4 subpixels. The 35 parallax images arranged in one elementary three-dimensional image are arranged in the subpixels arranged in an array of five rows and five columns according to a predetermined rule. The 35 parallax images are sequentially arranged by repeatedly applying a pattern in which first five parallax images are arranged.

In detail, the parallax images arranged at the leftmost side of each row are $4^{th}$, $7^{th}$, $3^{rd}$, $6^{th}$, $2^{nd}$, $5^{th}$ and $1^{st}$ parallax images which are sequentially arranged from an uppermost side to a lowermost side. The sequence number of the parallel image increases by 7 from the left side to the right side in each row. That is, within one elementary three-dimensional image, if a $15^{th}$ parallax image is arranged in any subpixel, a $22^{nd}$ parallax image is arranged at the right side thereof.

In more detail, among the subpixels of the elementary three-dimensional image, $4^{th}$, $11^{th}$, $18^{th}$, $25^{th}$ and $32^{nd}$ parallax images are arranged in the subpixels of a first row from the left side to the right side, $7^{th}$, $14^{th}$, $21^{st}$, $28^{th}$ and $35^{th}$ parallax images are arranged in the subpixels of a second row from the left side to the right side, $3^{rd}$, $10^{th}$, $17^{th}$, $24^{th}$, and $31^{st}$ parallax images are arranged in the subpixels of a third row from the left side to the right side, $6^{th}$, $13^{th}$, $20^{th}$, $27^{th}$, and $34^{th}$ parallax images are arranged in the subpixels of a fourth row from the left side to the right side, $2^{nd}$, $9^{th}$, $16^{th}$, $23^{rd}$, and $30^{th}$ parallax images are arranged in the subpixels of a firth row from the left side to the right side, $5^{th}$, $12^{th}$, $19^{th}$, $26^{th}$, and $33^{rd}$ parallax images are arranged in the subpixels of a sixth row from the left side to the right side, and arranging $1^{st}$, $8^{th}$, $15^{th}$, $22^{nd}$, and $29^{th}$ parallax images are arranged in the subpixels of a seventh row from the left side to the right side.

Wherein, the parallax images in a second row are located on same line in parallel direction with the parallax images in a first row, the parallax images in a fourth row are located on same line in parallel direction with the parallax images in a third row, and the parallax images in a sixth row are located on same line in parallel direction with the parallax images in a fifth row.

When the parallax images are arranged as shown in FIG. 9, the vertical axis 25 of the lenticular lens plate 24 must be tilted from the vertical axis of the flat display device 22 by the predetermined angle α in order to display the 25 parallax images using one lenticular lens without deteriorating the resolution. At this time, the tilt angle α of the vertical axis 25 of lenticular lens plate 24 may be calculated using a triangle 29 shown in FIG. 9 and is expressed by Equation 3.

$$\alpha=\arctan(5Hp/7Vp) \quad \text{Equation 3}$$

where, Hp denotes a subpixel period in the horizontal direction and Vp denotes a subpixel period in the vertical direction.

At this time, one lenticular lens 24a included in the lenticular lens plate 24 is formed in correspondence with five subpixels arranged in the horizontal direction.

Figure 12:
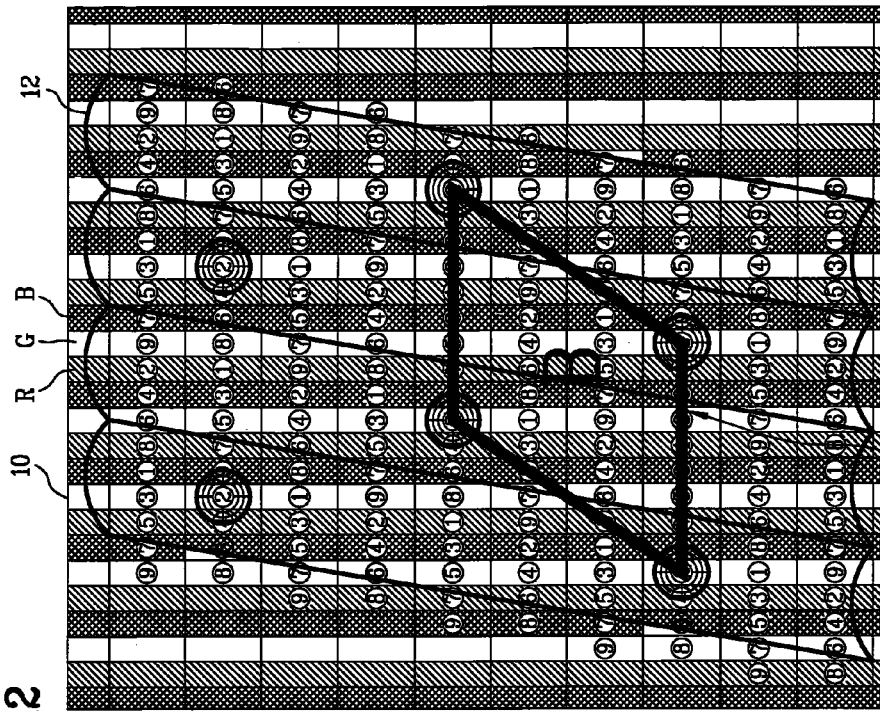
FIG. 12 is a view showing the comparison between the resolution of the first embodiment of the three-dimensional image display apparatus according to the present invention and the resolution of the conventional three-dimensional image display apparatus.
Figure 12:
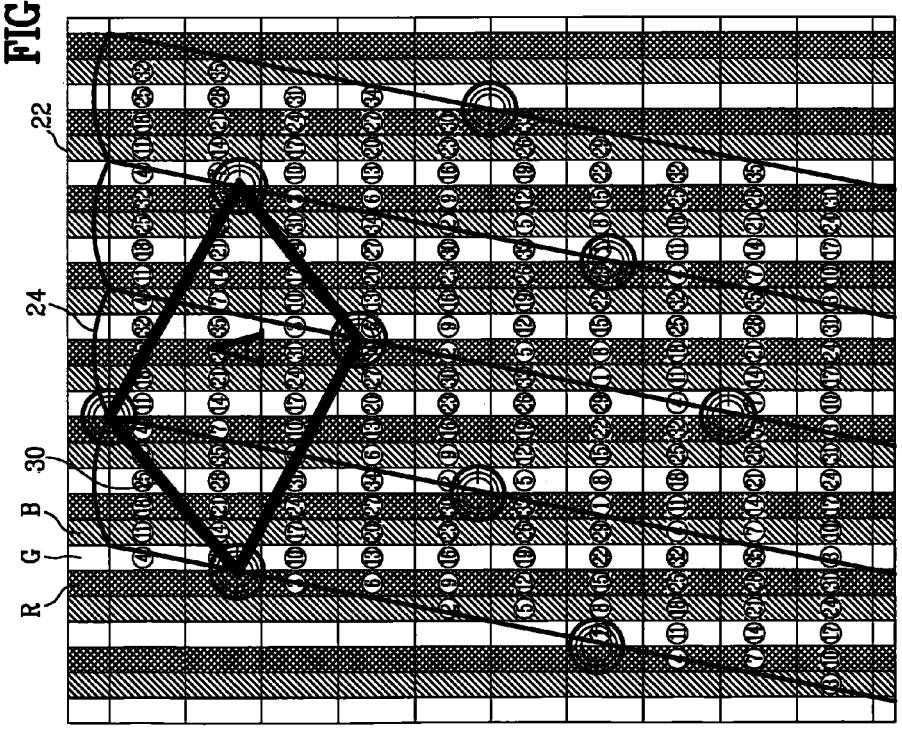

FIG. 12 is a view showing the comparison between the resolution of the first embodiment of the three-dimensional image display apparatus according to the present invention and the resolution of the conventional three-dimensional image display apparatus.

FIG. 12 shows a case where the elementary three-dimensional image is configured using 35 parallax images and the lenticular lens plate 24 is tilted by the angle calculated by Equation 4, according to the embodiment of the present invention. FIG. 12B shows a case where the elementary three-dimensional image is configured using 9 parallax images and the lenticular lens plate 12 is tilted by the angle calculated by Equation 1, according to the conventional three-dimensional image display apparatus. In FIG. 12, rectangles 30 and 32 indicate unit resolutions due to the effects of the lenticular lens plates 24 and 12, respectively. As an area A or B decreases, resolution increases.

As shown, since the area A of the unit resolution of the apparatus according to the present invention using the 35 parallax images is about 83% of the area B of the unit resolution of the conventional apparatus using the 9 parallax images, it can be seen that the resolution of the three-dimensional image display apparatus according to the present invention is higher than that of the conventional apparatus. That is, since the number of parallax images used in the apparatus according to the present invention is larger than that used in the conventional apparatus, it can be seen from Equation 4 that the size of the elementary three-dimensional space increases and the resolution is improved.

Figure 13:
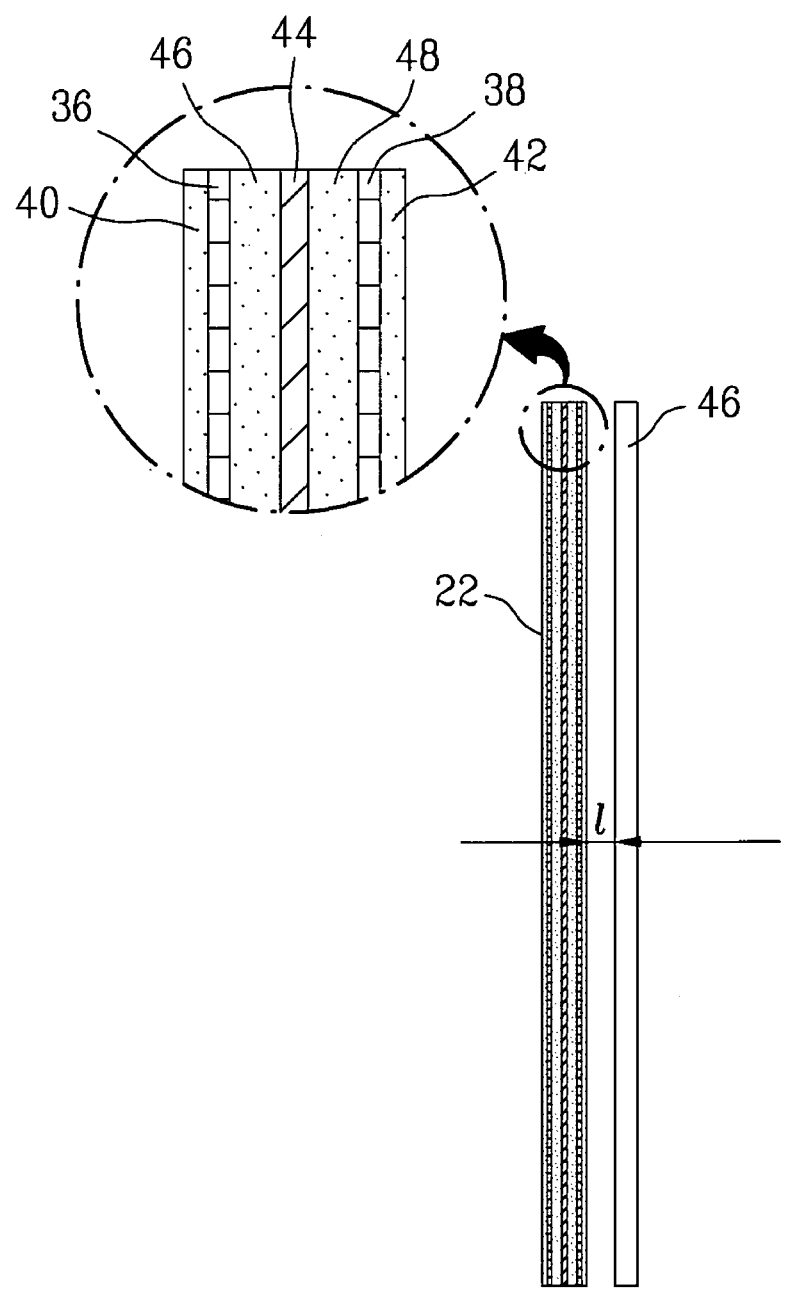
FIG. 13 is a viewing a three-dimensional image display apparatus can prevent the LCD using a flat display device from being curved.

FIG. 13 is a viewing a three-dimensional image display apparatus can prevent the LCD using a flat display device from being curved.

As shown in FIG. 13, when the flat display device 22 is implemented by an LCD, a three-dimensional image display apparatus can prevent the LCD from being curved by attaching a support plate at the outside of the LCD. As shown, flat support plates 40 and 42 are attached to the outer surfaces of polarization plates 36 and 38 in the LCD of the three-dimensional image display apparatus according to the present embodiment. The flat support plates 40 and 42 are formed of transparent glass or transparent plastic, similar to transparent substrates 46 and 48 located outside a liquid crystal layer 44.

Although the flat support plates 40 and 42 are attached to the outer surfaces of the polarization plates 36 and 38 in the above-described embodiments, the flat support plate may be attached to any one of the outer surfaces of the polarization plates 36 and 38 in a modified embodiment. In the above-described three-dimensional image display apparatus, a slit array sheet may be used as a three-dimensional filter for dividing a plurality of parallax images, instead of the lenticular lens plate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The number of parallax images used in the apparatus according to the present invention is larger than that used in the conventional apparatus, therefore it can be seen that the size of the elementary three-dimensional space increases and the resolution is improved.

The invention claimed is:

1. A three-dimensional image display apparatus, comprising:
   a display device displaying a plurality of parallax images so as to implement a three-dimensional image; and
   a lenticular lens plate located on the display device and having a vertical axis tilted from a vertical axis of the display device by a predetermined angle α, wherein the lenticular lens plate is spaced apart from the display device by a predetermined distance,
   wherein the number of parallax images included in an elementary three-dimensional image of the three-dimensional image is a multiple of 7, and
   wherein the predetermined angle α is obtained by $\alpha = \arctan(5Hp/7Vp)$ (where, Hp denotes a subpixel period in a horizontal direction and Vp denotes a subpixel period in a vertical direction).

2. The three-dimensional image display apparatus according to claim 1, wherein:
   the elementary three-dimensional image is configured by 35 parallax images, and
   the width of one lenticular lens included in the lenticular lens plate corresponds to five subpixels of the elementary three-dimensional image, which are arranged in the horizontal direction.

3. The three-dimensional image display apparatus according to claim 1, wherein the elementary three-dimensional image is repeatedly arranged in the horizontal direction and is repeatedly arranged in the vertical direction while being shifted by 4 columns.

4. The three-dimensional image display apparatus according to claim 1, wherein the elementary three-dimensional image is configured by:
   arranging 4th, 11th, 18th, 25th and 32nd parallax images in a first row from a first side to a second side,
   arranging 7th, 14th, 21st, 28th and 35th parallax images in a second row from the first side to the second side,
   arranging 3rd, 10th, 17th, 24th, and 31st parallax images in a third row which is shifted from the second row by one subpixel in a first side from the first side to the second side,
   arranging 6th, 13th, 20th, 27th, and 34th parallax images in a fourth row from the first side to the second side,
   arranging 2nd, 9th, 16th, 23rd, and 30th parallax images in a fifth row which is shifted from the fourth row by one subpixel in a first side from the first side to the second side,
   arranging 5th, 12th, 19th, 26th, and 33rd parallax images in a sixth row from the first side to the second side, and
   arranging 1st, 8th, 15th, 22nd, and 29th parallax images in a seventh row which is shifted from the sixth row by one subpixel in the left direction from the right side to the left side.

5. The three-dimensional image display apparatus according to claim 1, wherein the parallax images in a second row are located on same line in parallel direction with the parallax images in a first row.

6. The three-dimensional image display apparatus according to claim 1, wherein the parallax images in a fourth row are located on same line in parallel direction with the parallax images in a third row.

7. The three-dimensional image display apparatus according to claim 1, wherein the parallax images in a sixth row are located on same line in parallel direction with the parallax images in a fifth row.

8. The three-dimensional image display apparatus according to claim 1, wherein:
   the display device is a liquid crystal display panel (LCD), and
   a light source is further included.

9. The three-dimensional image display apparatus according to claim 1, wherein the display device is a plasma display panel (PDP).

10. The three-dimensional image display apparatus according to claim 1, wherein the lenticular lens plate is spaced apart from the display device by a predetermined distance such that an image is laid on a focus surface of the lenticular lens.

* * * * *